United States Patent [19]

Mima et al.

[11] 3,962,158

[45] June 8, 1976

[54] HYDROPHILIC POLYMER MEMBRANES OF POLYVINYL ALCOHOL AND CHITOSAN

[75] Inventors: Seiichi Mima, Toyonaka; Susumu Yoshikawa; Masaru Miya, both of Ikeda, all of Japan

[73] Assignee: Director-General of the Agency of Industrial Science and Technology, Tokyo, Japan

[22] Filed: Apr. 1, 1975

[21] Appl. No.: 563,962

[30] Foreign Application Priority Data
Apr. 5, 1974 Japan.............................. 49-39167

[52] U.S. Cl..................... 260/17.4 CL; 210/500 M; 260/17.4 R; 260/17.4 SG
[51] Int. Cl.² ...................... B01D 13/00; C08L 5/08

[58] Field of Search................ 260/17.4 CL, 17.4 R, 260/17.4 SG; 210/500 M

[56] References Cited
UNITED STATES PATENTS

| | | | |
|---|---|---|---|
| 2,343,094 | 2/1944 | Smith...................................... | 260/8 |
| 3,658,745 | 4/1972 | Merrill et al. .................. | 260/29.6 B |
| 3,770,673 | 11/1973 | Slagel et al. ........................ | 260/17.4 |

*Primary Examiner*—Donald E. Czaja
*Assistant Examiner*—Edward Woodberry

[57] ABSTRACT

Hydrophilic polymer membranes useful as semipermeable membranes or ultrafilter membranes, are manufactured by forming a film from an aqueous solution containing polyvinyl alcohol and a chitosan salt and then subjecting the film to an alkali treatment.

8 Claims, No Drawings

HYDROPHILIC POLYMER MEMBRANES OF POLYVINYL ALCOHOL AND CHITOSAN

BACKGROUND OF THE INVENTION

This invention relates to hydrophilic polymer membranes which comprise polyvinyl alcohol and chitosan and are excellent in permeability and mechanical strength. These polymer membranes are advantageously used as ultrafilter membranes and semi-permeable (dialytic) membranes, in particular, those for use in artificial kidneys.

Hitherto, hydrophilic polymer membranes comprised of cellulose or polyvinly alcohol are known. Such hydrophilic polymer membranes are used as semi-permeable membranes or ultrafilter membranes for separating substances in a system where water is present. Membranes for these uses are required to be excellent in solute permeability and mechanical strength in the wet state. A number of studies have been made with respect to natural and synthetic polymer materials for use as dialysis membranes and as a result, cellulosic membranes are found relatively good in both permeability and mechanical strength, though not entirely satisfactory. For practical applications, however, further improvement in both properties is required.

Polyvinyl alcohol membranes have very excellent permeability in water but are extremely poor in mechanical strength. Although much research has have been done for the purpose of enhancing the mechanical strength, appreciable improvement has not yet been attained. Chitosan, which is obtained by deacetylation of chitin, widely distributed in the natural world, is better in permeability than cellulosic membranes but, it is poorer in mechanical strength than cellulosic membranes. Thus, chitosan cannot be said to be superior to cellulosic membranes.

In general, improvement of a membranes in both permeability and mechanical strength has been deemed extremely difficult in view of the fact that the permeation rate tends to increase in proportion to the degree of water absorption of a membrane, while contrarily the mechanical strength easily tends to decrease with increase of the degree of water absorption. For instance, polyvinyl alcohol membranes become water-resistant by a thermal treatment, but the membranes thus treated are very poor in mechanical strength in the wet state so that they can hardly be applied to practical uses. The mechanical strength of polyvinyl alcohol membranes can be enhanced by acetalization or the like reaction. However, the degree of water absorption and permeability characteristics are considerably lessened along with the increase of mechanical strength. In the prior art, therefore, it is extremely difficult to obtain polymer membranes which are satisfactory in permeability and mechanical strength. Accordingly, there is a great demand for development of a polymer membrane furnished with excellent permeability and mechanical strength.

BRIEF SUMMARY OF THE INVENTION

It is an object of this invention to provide a new hydrophilic polymer membrane excellent in both permeability and mechanical strength.

It is another object of this invention to provide a new hydrophilic polymer membrane improved in permeability and mechanical strength, which is composed essentially of polyvinyl alcohol and a specific polymer substance.

It is still another object of this invention to provide a method of manufacturing a hydrophilic polymer membrane excellent in both permeability and mechanical strength.

Other objects, features and advantages of this invention will be more fully explained in the following description.

DETAILED DESCRIPTION OF THE INVENTION

It has now been found unexpectedly that a membrane manufactured from polyvinyl alcohol admixed with chitosan is exceedingly enhanced in its strength as compared with the starting polyvinyl alcohol and is superior in both permeability and mechanical strength to a cellulosic membrane.

The hydrophilic polymer membranes of this invention are comprised essentially of polyvinyl alcohol and chitosan and are manufactured by mixing an aqueous solution of polyvinyl alcohol with that of an organic or inorganic acid salt of chitosan, forming a film from the mixed aqueous solution and then subjecting the film to an alkali treatment.

Polyvinyl alcohol utilizable for this invention is defined herein as a polymer which contains in its molecule at least 85 mol%, preferably 98 mol % of a vinyl alcohol unit. Such polyvinyl alcohol may be a vinyl alcohol copolymer containing comonomer units of a vinyl compound such as ethylene or propylene. Such polyvinyl alcohol is prepared by hydrolysis (saponification) of the corresponding vinyl acetate polymer or copolymer. The polyvinyl alcohol is soluble in a solution containing water as its predominant component and is used in the form of an aqueous solution for the manufacture of a film.

Chitosan can easily be prepared by complete or partial deacetylation of chitin which is a main component contained in the shell of crab, lobster and the like. Referring to a chemical formula, chitosan can briefly be explained as a compound wherein one of the OH-groups in the 6-membered ring unit of cellulose is substituted by $NH_2$ group. Thus, chitosan readily reacts with an organic or inorganic acid to form a salt which is soluble in water.

In the polymer membranes of this invention, the content of chitosan is 5–60% by weight, preferably 10–40% by weight of the blend. If the proportion becomes less than 5% by weight, the beneficial effect achievable by addition of chitosan will be significantly reduced so that a polymer membrane excellent in both permeability and mechanical strength may no longer be produced. On the other hand, if the proportion becomes more than 60% by weight, any additional merits will hardly be obtained thereby, thus rather incurring economical disadvantages. Moreover, chitosan will be leached away in an acidic medium if the membrane is higher in its chitosan content.

The polymer membranes of this invention are advantageously manufactured in such a manner as will be described hereunder. Polyvinyl alcohol is dissolved in water to form an aqueous solution having a concentration of 1–10% by weight, preferably 2–5% by weight. A chitosan salt with an organic or inorganic acid is dissolved in water to form an aqueous solution having a concentration of 1–10% by weight, preferably 2–5% by weight. Both aqueous solutions are mixed in a given ratio to form a homogeneously mixed solution. Illustrative of the form of the chitosan in this case are the salts with organic acids such as formic acid, acetic acid, propionic acid, acrylic acid, methacrylic acid, etc. or with inorganic acids such as hydrochloric acid, sulfuric acid, etc. The mixed aqueous solution thus obtained are worked up to a film suitable for the intended purpose. For example, this film-forming process can be carried out by spreading the solution on a plate and evaporating water to form a flat film sheet or alternatively by subjecting the solution to a hollow spinning operation to form a hollow fibrous film. The resultant film is then subjected to a treatment for enhancing water-resistance. This treatment is carried out by heating the film at 100°–180°C, subjecting the film to acetalization or exposing the film to actinic irradiation whereby a partial cross-linking takes place in the film. This treatment may also be carried out by previously combining a small amount of a carboxylic acid containing a vinyl group with the OH groups of polyvinyl alcohol, forming a film from the mixed aqueous solution containing such modified polyvinyl alcohol, and then cross-linking the vinyl groups by subjecting the film to a polymerization reaction in the presence of a catalyst or under irradiation of actinic light. The film subjected to the water-resistance-imparting treatment is then subjected to an alkali treatment which gives rise to a water-insoluble free chitosan. The alkali treatment in this case is carried out by soaking the film into an aqueous solution of alkali such as sodium hydroxide or potassium hydroxide or a solution of an organic base such as pyridine, ammonia or an aliphatic amine.

In case the mixed aqueous solution for manufacturing a blend film is prepared in accordance with this invention, polyvinyl alcohol and chitosan may be mixed with each other in an acidic solution.

The membrane of this invention comprised of a blend of polyvinyl alcohol and chitosan is very excellent in both mechanical strength and permeability. For example, the membrane in the wet state is 100 times as high in mechanical strength as polyvinyl alcohol membranes. In comparison with cellulosic membranes, the blend membrane is 2–3 times stronger in mechanical strength and is significantly higher in permeability. For example, permeability for uric acid of the membrane is 4 times as high as that of cellulosic membranes.

This invention will now be understood more readily with reference to the following examples. However, these examples are intended to illustrate the invention and are not to be construed as limiting the scope of the invention. In the examples, percentages are by weight unless otherwise indicated.

EXAMPLE 1

Three grams of polyvinyl alcohol (the mean degree of polymerization: 2000) were dissolved in water and the whole volume of the solution was made to 100 ml. Three grams of dry chitosan were placed at room temperature in a 1.5% acetic acid and left for about one hour to effect complete dissolution. The whole volume of the solution was made to 100 ml with water whereby a viscous aqueous solution of chitosan acetic acid salt was obtained. The aqueous solution of polyvinyl alcohol was thoroughly mixed with the aqueous solution of the chitosan salt in a mixing ratio of 4:1 and a given quantity of the mixed solution was spread evenly on a glass plate and dried at room temperature whereupon a film of polyvinyl alcohol and the chitosan salt having a thickness of about 30 $\mu$ was obtained. The film was subjected to a heat treatment conducted at 110°C for 8 hours. The film thus treated was then soaked in a 2% aqueous solution of sodium hydroxide for 2 hours and washed thoroughly with water to form a membrane of polyvinyl alcohol and chitosan. The membrane was dipped into water at room temperature for a period of at least 7 days and then measured for degree of water-absorption whereby the value of the degree of water-absorption was determined as 102%. The membrane was cut into strips of 2 mm in width and 30 mm in length and then measured for tensile strength and elongation. The values determined were 280 kg/cm$^2$ and 226%, respectively. The permeability coefficients of this membrane measured at 37°C for urea and uric acid were 12.8 ($\times$ 10$^{-7}$ cm$^2$/sec) and 22.6 ($\times$ 10$^{-7}$ cm$^2$/sec), respectively. A result of measurements made for a cellulosic membrane (Cuprophane) under similar measurement conditions was as follows:

Tensile strength: 225 kg/cm$^2$ (in longitudinal direction)
                    89 kg/cm$^2$ (in transverse direction)
Elongation: 36% (in longitudinal direction)
           136% (in transverse direction)
Permeability coefficient: 8.4 ($\times$ 10$^{-7}$ cm$^2$/sec) for urea
                          5.6 ($\times$ 10$^{-7}$ cm$^2$/sec) for uric acid

EXAMPLES 2–5

Membranes were manufactured in a manner similar to that described in Example 1 except that the proportion of polyvinyl alcohol to chitosan was varied. The tensile strength, elongation, degree of water absorption and permeability coefficient measured for each blend were as shown in the following table. The various characteristics were also measured for polyvinyl alcohol, chitosan and cellulosic membranes. For the purpose of comparison, the results of these measurements and the result of measurements in Example 1 are also given in the following table.

Table

| | Composition (%) (polyvinyl alcohol/chitosan) | Tensile strength (kg/cm$^2$) | Elongation (%) | Degree of water absorption (%) | Permeability coefficient ($\times$ 10$^{-7}$ cm$^2$/sec) | |
|---|---|---|---|---|---|---|
| | | | | | Urea | Uric acid |
| Example 1 | 80/20 | 280 | 226 | 102 | 12.8 | 22.6 |
| Example 2 | 95/5 | 26 | 203 | 230 | — | — |
| Example 3 | 90/10 | 230 | 232 | 125 | 14.0 | 22.4 |
| Example 4 | 60/40 | 250 | 158 | 112 | 15.8 | 19.8 |
| Example 5 | 40/60 | 120 | 100 | 93 | 19.5 | 18.6 |
| Referential example 1 | Polyvinyl alcohol | 6 | 237 | 310 | 16.4 | 22.1 |
| example 2 | Chitosan | 87 | 47 | 69 | 29.1 | 12.7 |
| example 3 | Cellulose | 225 (longitud.) | 36 (longitud.) | | | |

Table-continued

| Composition (%) (polyvinyl alcohol/chitosan) | Tensile strength (kg/cm²) | Elongation (%) | Degree of water absorption (%) | Permeability coefficient (× 10⁻⁷ cm²/sec) | |
|---|---|---|---|---|---|
| | | | | Urea | Uric acid |
| (Cuprophane) | 89 (transver.) | 136 (transver.) | 61 | 8.4 | 5.6 |

*longitud. — longitudinal
transver. — transverse

EXAMPLE 6

A 3% aqueous solution of polyvinyl alcohol and a 3% aqueous solution of a chitosan salt which has been prepared by dissolving chitosan in a 1% formic acid were thoroughly mixed with each other in a mixing ratio of 4:1 and the mixed solution was spread evenly on a glass plate and dried at room temperature to form a blend film of polyvinyl alcohol and the chitosan salt. This film was subjected to a heat treatment conducted at 110°C for 8 hours, soaked in a 2% aqueous solution of potassium hydroxide for 3 hours and then washed thoroughly with water to obtain a membrane. The various physical characteristics of this membrane were measured in a manner similar to that described in Example 1 whereby the following result was obtained:

Tensile strength: 231 kg/cm²; Elongation: 195%;
Degree of water absorption: 118%; and
Permeability coefficient for urea: 15.6 × 10⁻⁷ cm²/sec

EXAMPLE 7

An experiment was carried out in a manner similar to that described in Example 6 except that the heat treatment was conducted at 160°C for 60 minutes. The physical characteristics measured for the resulting membrane were as follows:

Tensile strength: 226 kg/cm²; Elongation: 224%
Degree of water absorption: 95.7%; and
Permeability coefficient for urea: 17.5 × 10⁻⁷ cm²/sec.

EXAMPLE 8

A 3% aqueous solution of polyvinyl alcohol and a 3% aqueous solution of a chitosan salt which had been prepared by dissolving chitosan in a 1% hydrochloric acid were thoroughly mixed with each other in a mixing ratio of 4:1 and the mixed aqueous solution was spread evenly on a glass plate and dried to obtain a blend film. This film was subjected to a heat treatment conducted at 180°C for 10 minutes, soaked in a 2% aqueous solution of sodium hydroxide for 3 hours and then washed thoroughly with water to manufacture a membrane. The various physical characteristics of this membrane were measured in a manner similar to that described in Example 1 whereby the following result was obtained:

Tensile strength: 319 kg/cm²;
Elongation: 290%;
Degree of water absorption: 63%; and
Permeability coefficient for urea: 10.2 × 10⁻⁷ cm²/sec.

What is claimed is:

1. A hydrophilic polymer membrane which comprises a blend of polyvinyl alcohol and chitosan wherein said polyvinyl alcohol contains in its molecule at least 85 mol % vinyl alcohol units and said chitosan is present in an amount of 5–60% by weight based on said blend.

2. A water-resistant hydrophilic polymer membrane which comprises a blend of polyvinyl alcohol and chitosan wherein said polyvinyl alcohol contains in its molecule at least 85 mol % vinyl alcohol units and said chitosan is present in an amount of 5–60% by weight of the total blend and which has been subjected to a water-resistance-imparting treatment.

3. A membrane according to claim 2 wherein said water-resistance-imparting treatment has been attained by a heat treatment conducted at 100°–180°C.

4. A method of manufacturing a hydrophilic polymer membrane comprising forming a film from an aqueous solution containing polyvinyl alcohol and a chitosan salt and then subjecting said film to an alkali treatment wherein said polyvinyl alcohol contains in its molecule at least 85 mol % vinyl alcohol units and said chitosan is present in said aqueous solution in an amount of 5–60% by weight based on the total amount of said polyvinyl alcohol and said chitosan.

5. A method according to claim 4 additionally comprising subjecting said film to a water-resistance-imparting treatment before subjecting it to said alkali treatment.

6. A method according to claim 5 wherein said water-resistance-imparting treatment is attained by a heat treatment conducted at 100°–180°C.

7. A method of manufacturing a hydrophilic polymer membrane which comprises forming a film from an acidic solution containing polyvinyl alcohol and chitosan and then subjecting said film to a water-resistance-imparting treatment wherein said polyvinyl alcohol contains in its molecules at least 85 mol % vinyl alcohol units and said chitosan is present in said acidic solution in an amount of 5–60% by weight based on the total amount of said polyvinyl alcohol and said chitosan.

8. A method according to claim 7 wherein said water-resistance-imparting treatment is attained by a heat treatment conducted at 100°–180°C.

* * * * *